United States Patent

[11] 3,555,984

| [72] | Inventor | Waldemar T. Rentschler<br>Calmbach, Black Forest, Germany |
|---|---|---|
| [21] | Appl. No. | 598,388 |
| [22] | Filed | Dec. 1, 1966 |
| [45] | Patented | Jan. 19, 1971 |
| [73] | Assignee | Prontor-Werk Alfred Gauthier G.m.b.H.<br>Calmbach, Black Forest, Germany |
| [32] | Priority | Dec. 4, 1965 |
| [33] | | Germany |
| [31] | | P38,278 |

[54] PHOTOGRAPHIC CAMERA HAVING AN ELECTRONIC EXPOSURE TIMING DEVICE
4 Claims, 4 Drawing Figs.

[52] U.S. Cl............................................... 95/10,
95/53, 95/64
[51] Int. Cl.............................................. G03b 7/08,
G03b 9/06
[50] Field of Search............................................ 95/10C, 53

[56] References Cited
UNITED STATES PATENTS
3,442,190  5/1969  Erickson ...................... 95/10C
3,063,354  11/1962  Matulik et al.................. 95/10(C)
3,286,610  11/1966  Fahlenberg..................... 95/10(C)
3,336,850  8/1967  Otani et al. ................... 95/10(C)

*Primary Examiner*—John M. Horan
*Assistant Examiner*—Joseph F. Peters, Jr.
*Attorney*—Otto John Munz ABSTRACT: Electronic circuit means, including a light responsive device, is provided to adjust camera exposure time automatically. The particular circuit parameters under which the electronic circuit means operates can be preselected by manual positioning of two setting members. A first of these setting members controls by its position the size of the shutter aperture. A second of these setting members controls by its position which of a set of resistors is connected in the electronic circuit means and it also controls by its position the zero setting of a meter having a scale showing exposure time. The first and second setting members are interconnected at a distance from one another determined by film sensitivity. After initial positioning of the interconnected setting members, the electronic circuit means automatically adjusts exposure time as a function of light intensity.

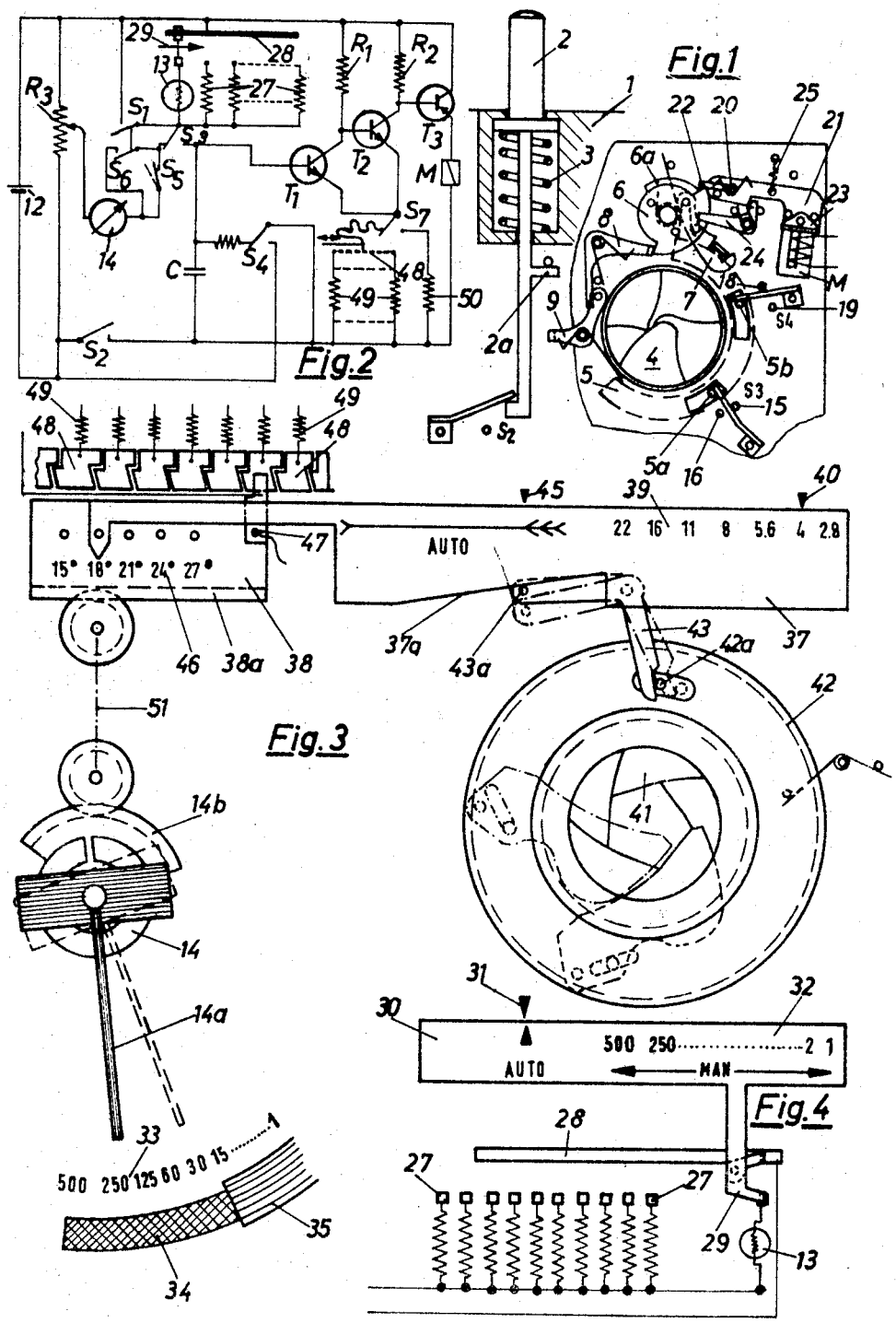

PHOTOGRAPHIC CAMERA HAVING AN ELECTRONIC EXPOSURE TIMING DEVICE

The invention concerns a photographic camera having a device for exposure timing which is electronically controlled by a light responsive device, light responsive device being adapted to be connected either to an electronic timing circuit or together with a battery to a moving coil meter, the pointer of which cooperates with an indicating scale calibrated in exposure time values.

In cameras having an electronic circuit controlled by a light responsive device for exposure timing it is known to preselect a definite diaphragm aperture and also to take this aperture preselection into consideration in the electronic circuit, so that an exposure time is obtained corresponding to the aperture preselection made. Furthermore it is known in a camera of the type referred to above to provide a moving coil meter which may be connected in the circuit affected by the light responsive device and which cooperates with an indicating scale calibrated in exposure time values. This enables the photographer to convert a camera with aperture preselection into one with preselection of time, since the arrangement is such that the aperture preselection is also taken into consideration in the deflection of the moving coil meter, if the latter has been connected in the circuit affected by the light responsive device. But cameras having time preselection can be of greater importance for practical requirements of photography than cameras having aperture preselection, since it is of prime importance to suit the exposure time to the speed of movement of the subject matter of the exposure.

Cameras are already known which are equipped with an electronic timing device adapted to be controlled in dependence upon the degree of illumination of a light-responsive device, and, with a moving coil meter. In this case it has already been proposed to arrange a changeover switch coupled with the shutter release, by means of which the light responsive device is adapted to be connected either in the circuit of the moving-coil meter or in the circuit of the electronic circuit determining the exposure duration. To take certain preselection factors, such as aperture, film sensitivity into consideration both during indication of the moving coil measuring mechanism and during the electronic timing a variable diaphragm and/or a grey wedge has been arranged in front of the light responsive device. This prior arrangement, which as such takes all the preselection factors important to the indication of the moving-coil meter into consideration, is not perfect in that the said variable device arranged in front of the light responsive device, requires some space and also mechanical coupling means for connecting it with the preselector setting members.

These disadvantages and those of known camera arrangement may be avoided in accordance with the invention by the fact that means are provided to exert an influence on the threshold value (timing setting) of the electronic circuit and to effect an alteration between the relative positions of moving-coil meter and indicating scale, the said means being coupled with the setting members of all preselecting factors decisive for the exposure time, more particularly aperture and film sensitivity. An essential advantage of this arrangement resides in that it avoids the use of a light-reducing device in front of the light-sensitive device. Any light responsive device on a camera requires a space determined by the dimensions of the light responsive device itself, but with the present invention it may be located at any suitable point on the camera. The proposed arrangement is also advantageous in that only electric wires lead to the light responsive device, whilst other connections, more particularly of a mechanical kind, are omitted. The consideration of the different preselection factors for the electronic exposure time determination may be effected by changing the threshold value of the electronic circuit, i.e. by electrically varying the working point at which the electronic circuit changes over from a previously existing stable state to another. The preselection factors affecting the indication of the moving-coil meter are obtained in a reliable and uncomplicated manner since each value of a preselection factor has a certain relative position of meter and indicating scale associated therewith.

In order to obtain a simple construction, economical alike of space and components both from a mechanical and electrical point of view, provision is made in a camera with the features of the present invention that at least two of the preselection setting members are interconnected in known manner for movement engagement and are adapted to be coupled in various relative positions determined by a setting scale and mark, and that the devices serving to take the preselection factors into consideration in the electronic circuit and in the meter indication are adapted to be actuated by means of one of the two preselection setting members.

According to a further proposal, the invention provides a switch by means of which, immediately after depression of the shutter release, the light responsive device is adapted to be disengaged automatically from the moving-coil meter and connected for the period of the shutter action to the electronic circuit. By this step the exposure time indication is almost constantly visible, i.e. the camera is constantly indicative, since with instantaneous exposure times the brief cutout of the moving coil meter is practically undetectable owing to human reaction inertia and the inertia of the measuring mechanism pointer. This is particularly the case since the length of changeover time is dependent only on the shutter timing and not on the movement of the camera release.

To obtain a functionally reliable and inexpensive switch actuation it is proposed that part of the shutter mechanism is used which moves in opposite directions during the opening and closing of the camera shutter. In this case it has been possible without noticeable additional structural addition to initiate changeover of the light responsive device with the commencement of movement of the camera shutter and return it to its normal connection to the meter at the completion of the movement. Preferably the switch is associated with a driving ring serving to perform the opening and closing movements of the shutter blades.

Reference should now be made to the accompanying drawings in which:

FIG. 1 is a shutter mechanism of a camera with an electronic circuit exposure timing device, FIG. 2 is the wiring diagram of the electronic circuit exposure timing device, FIG. 3 shows schematically the adjusting mechanism provided to take into account the preselection factors, aperture and film sensitivity, in connection with a moving-coil meter which indicates in advance the exposure time to be expected, and FIG. 4 is manually actuated exposure time setting member adapted to cooperate with fixed resistors in the electronic circuit exposure timing device.

In FIG. 1 the numeral 1 denotes a camera housing in which a release button 2 is displaceably guided against the action of a spring 3. The button 2 cooperates with a shutter assembly, the blades 4 of which are adapted to be reciprocated in known manner by means of a crank drive engaging with a sector ring 5. The crank drive consists of a spring-actuated driving disc 6 and a driving pawl 7 engaging the sector ring 5 in the original or cocked position; a pivotally mounted stop lever 8 is provided which at one end cooperates with a projection of the driving disc 6 and at the other end with a lever 9. The latter is actuated by means of the projection 2a on the release button 2.

In addition to the mechanical shutter assembly described above an electronic circuit exposure timing device controlling shutter timing is provided, of which the wiring diagram is shown in FIG. 2. Essential components of this exposure timing device besides transistors and an RC network are a battery 12, and a switch $S_2$ actuated by the release button 2, the switch connecting an electromagnet M to the battery voltage just before the mechanical release of the shutter. The electromagnet M cooperates with the shutter assembly, as is explained below.

A further switch $S_3$ is provided for the purpose of switching a light responsive device 13 from a moving-coil meter 14 providing an advance indication of the time value to be expected, into that part of the circuit of the exposure timing device providing automatic regulation of the time which the shutter remains open. Preferably the sector ring 5 is used for actuating switch $S_3$. To this end the sector ring carries a pin 5a which causes the contact tongue of the switch $S_3$ in the original position of the ring (closed shutter) to be supported against a contact pin 15 electrically connected with the moving-coil meter. When the sector ring 5 leaves its original position, the switching tongue of switch $S_3$, following the pin 5a, encounters a further contact pin 16, which in turn is electrically connected for the above-mentioned automatic regulation.

The electronic circuit exposure timing device providing the shutter timing, functions after the shutter is opened and interrupts the action of the shutter blade drive for the duration of the time for which the shutter is to remain open. It is a relaxation circuit and for this purpose is equipped with the transistors $T_1$, $T_2$ and $T_3$, and also with a capacitor C. The circuit also includes the two collector resistors $R_1$ and $R_2$ associated with the transistors $T_1$ and $T_2$ and a further regulatable calibrating resistor $R_3$ connected in series with the moving coil meter 14. Furthermore the circuit includes an additional switch $S_4$ which is referred to as a charging starter switch. This switch is so arranged with regard to a pin 5b secured on the sector ring 5 that its switching tongue in the closed-shutter position of the ring is retained against the contact pin 18, but moves to pin 19 when the shutter blades open. This operation of the switch $S_4$ initiates the charging of the capacitor C. The switch $S_4$ does not make contact until $S_3$ has already done so. This is because the switching tongue of $S_3$ has to cover a shorter distance before reaching contact pin 16 than the switching tongue of switch $S_4$ before reaching the contact pin 19. The circuit action is such that when the operating voltage of the battery 12 is connected to the circuit by switch $S_2$, transistors $T_2$ and $T_3$ are conductive and hence the electromagnet M is energized. The transistor $T_1$ in this case is blocked. As soon however as the threshold value is reached after a certain charging time of the capacitor C dependent upon the ohmic value of the resistor connected in the circuit - in the operating region "AUTO" this would be the light-responsive device 13 - the transistor $T_1$ uddenly conducts whilst the transistors $T_2$ and $T_3$ are blocked, resulting in the instantaneous collapse of the magnetic field in the electromagnet M. This in turn releases the locking mechanism cooperating with the electromagnet M and retaining the shutter blades 4 in the open position, so that the blades are able to swing back from the open position, into the closed position.

An armature lever 21 mounted on a pin 20 serves as locking mechanism in the shutter assembly of FIG. 1 this lever at one end carries a spring-urged catch 22 and at the other end an armature 23 associated with the electromagnet M. The armature lever 21 cooperates with a bell crank lever 24, one lever arm of which is adapted to be positioned in the movement range of a stop flap 6a arranged on the driving disc 6 which lever arm is so positioned in FIG. 1. The bell crank lever is held in the position of FIG. 1 by means of the armature lever. During the transfer of the driving disc 6 into the cocked position shown in FIG. 1, the armature 23, due to the cooperation of driving disc 6 and armature lever 21, is pressed against the electromagnet M against the action of a return spring 25. This position is retained by the armature lever 21 under the influence of the magnetic field acting on the armature 23 from the electromagnet M, during the action of the electronic circuit exposure timing device, whereby the driving disc, during its action movement to the open position of the shutter blades 4, is caught by its flap 6a moving into abutment against the bell crank lever 24. As soon, however, as the electromagnet M is deenergized, the spring 25 draws the armature lever 21 back anticlockwise whereby the bell crank lever 24 is no longer supported against the armature lever. This in turn permits the driving disc 6 to rotate the lever 24 anticlockwise and consequently continue its action movement, i.e. closing the shutter again.

To permit photographs to be taken under conditions other than with light dependent timing, the light responsive device 13 is switched out and replaced by several fixed resistors 27, these being associated with a track 28 of conducting material. By means of this track and the sliding contact 29 which electrically connects the resistors 27 with the track one at a time, and which is secured to a manually actuated time setting member 30, the light responsive device 13 is removed from the circuit and replaced by one of the resistors 27. The time setting member 30 is adjustable relative to a fixed mark 31 and in addition to the designation "AUTO" bears a time scale 32 including conventional graded exposure time values in the order of magnitude of, for example, one five-hundredth sec. to 1 sec. Each of these time values has one of the fixed resistors 27 acting in the operating region "MAN" associated therewith.

As evident from FIG. 3, the moving-coil meter 14 is provided with a pointer 14a which moves relative to an exposure time scale 33 with exposure time values one five-hundredth sec. to 1 sec. This scale has been provided to indicate to the photographer whilst taking photos in the operating range "AUTO" what time value is to be expected during the action of the electronic exposure timing device. In addition to the numeral values a color scale may also be used, formed as a green area 34 extending over the time values one five-hundredth sec. to one thirtieth sec. and a red area adjoining and including the time values "one fifteenth" sec. to "1" sec. By means of this color scale 34, 35 and the position of the pointer 14a the photographer is able to see before taking a photograph whether the exposure time set by the prevailing light conditions allows nonshake handheld exposures or not. The former is the case if the pointer 14a assumes a position in the region of the green scale 34, whilst if the pointer swings into the region of the red scale area 35 the exposure set is too long for the camera to be handheld.

A switch $S_5$ is coupled with the time setting member 30 in such a manner that in the position "AUTO" it is closed and hence connection to the moving-coil meter 14 is established. On the other hand switch $S_5$ is open in the setting region "MAN." In the wiring diagram as shown in FIG. 2 the two switch positions indicated are shown by a full line and a broken line respectively. If in one of the setting positions of the region "MAN" of the time setting member 30 the battery voltage is to be checked, then a further switch $S_6$ ridges the switch $S_5$ open at "MAN," whereby a meter indication is given in this setting region of the camera.

The switch $S_6$ is coupled with the switch $S_1$ serving to test the battery voltage in such a manner that both switches move always in the same direction, i.e. both switches are either closed or opened. In this case the connection to the moving-coil meter 14 is broken by means of the switch $S_5$ to prevent wrong indications from occurring when reading the exposure time indication. In the setting region "MAN" the time scale 32 associated with the time setting member 30 is decisive, whilst the time scale 33 of the moving-coil meter 14 is only significant in the operating region "AUTO" of the camera.

As evident more particularly from FIG. 3 setting members 37 and 38 are provided for taking into account the decisive factors for the exposure time such as aperture and film sensitivity. The setting member 37 for the aperture is provided for this purpose with a control cam 37a and with an aperture scale 39 with which a fixed mark 40 is associated. Cooperating with the control cam 37a of the setting member 37 is a device which transmits the setting movements to the diaphragm, comprising pivotally mounted aperture blades 41 and an actuating member 42. A two-armed pivotally mounted lever is used to transmit the setting movements of the setting member 37 to the aperture mechanism 41, 42, one lever arm of which scans the control cam 37a by means of a pin 43a and the other lever arm of which acts on a pin 42a arranged on the actuating member. The pin is retained in positive abutment against the lever 43 by means of a spring. Apart from the aperture scale 39 the setting member 37 also has a setting region "AUTO," which is adjustable relative to a fixed mark 45. The limits of this region are marked by a plumed arrow; the multiply plumed end, as described below in detail, is synonymous with a short exposure time, whilst the single plumed end signifies a long exposure time.

The setting member 38 is adapted to be coupled in various relative positions with the setting member 37. For this purpose the setting member 38 may be equipped with several coupling positions associated with the individual film sensitivity values of a scale 46, the coupling of both setting members 37 and 38 being adapted to be effected by means of coupling pins or the like in the position corresponding to the sensitivity value of the film in use.

The setting member 38 carries a contact spring 47. The latter cooperates with contacts 48 arranged on an insulating plate, which contacts are so formed and mutually located that at least one is always in contact with the spring. Each individual contact 48 is electrically connected to a fixed resistor, designated in the wiring diagram by 49. These individual resistors which constitute emitter resistors, are of stepped ohmic values relative to one another. Apart from the fixed resistors 49 mentioned above, of which in the "AUTO" region of the camera only that one is switched into the circuit, which is associated with the scanned contact 48, the circuit includes a further fixed emitter resistor 50, which is always in circuit when the setting region "MAN" of the time setting member 30 is in use. By means of the time setting member 30 a switch $S_7$ is actuatable by which in the "AUTO" setting an electric connection to the emitter resistors 49 and in the "MAN" setting a connection to the fixed emitter resistance 50 is established. This in turn connects one of the resistors 49 or the resistor 50 to the transistors $T_1$ and $T_2$. This causes various threshold values and hence various exposure times corresponding to the setting positions of the setting members 37 and 38 to be obtained, in dependence upon preselected values for aperture and film sensitivity.

A geared connection 51 is provided between the setting member 38 and the moving-coil meter. This geared connection is indicated only symbolically in FIG. 3. It includes a rack 38a on the setting member 38 and a toothed segment 14b on the frame of the moving-coil measuring mechanism 14. All movements of the two setting members 37 and 38 are consequently positively transmitted to the moving-coil meter via the geared connection 51, which in turn results in the variation of the basic setting of the meter. The position of the pointer 14a of the moving-coil meter 14 in the automatic region of the camera is hence not only dependent upon the lighting conditions taken into account via the light-responsive device 13, but also upon the relative setting positions of both setting members 37 and 38, and upon the position of the setting member 37 relative to the fixed mark 45 as reference basis in the region "AUTO." As evident from the drawing it is not possible to tell from the mark 45 in the arrowed setting region "AUTO" of the setting member 37, which exposure time value has been set i.e. short or long, by reference to the arrows, or what exposure will result during the subsequent functioning of the electronic circuit exposure timing device. Information concerning this is imparted by the pointer position of the moving-coil meter 14 relative to the exposure time scale 33 associated therewith.

From a functional point of view the setting member 37 is an aperture setting member, since by its actuation a certain aperture value of the diaphragm 41, is selected. But this setting member also actuates a device which exerts an influence on the timing of the electronic switching device by means of the contact spring 47 on the setting member 38. The setting member 37 may thus also be designated as a time preselection setting member. Because the aperture setting is automatically taken into account during timing, the user of the camera operates on the principle of time preselection, as is the case in automatic cameras; from a technical point of view an aperture preselection with automatic timing is provided. To simplify the operation of the camera the indicating scale 33 and the moving-coil meter pointer could either be mounted in or reflected in a luminous-frame view finder.

I claim:

1. In a photographic camera, a combination comprising: an electronic circuit exposure timing device including, and controlled by, a light responsive device; a moving coil meter; means to connect said light responsive device either to said electronic circuit exposure timing device or to said moving coil meter; the moving coil meter including an indicating scale calibrated in exposure time values and a pointer cooperating with said indicating scale; setting members for all factors of an exposure time; means in said electronic circuit exposure timing device to exert an effect on the threshold value thereof; an interconnection between at least two of said setting members, said interconnection having various relative coupling positions; said means to exert an effect on the threshold value including a set of resistors; switching means between one of said setting members and said set of resistors for affecting the threshold value of the electronic circuit exposure timing device, and mechanical coupling means between said one setting member and said moving coil meter to alter the position of the pointer of said meter relative to said scale in accordance with the position of said setting member.

2. A combination as recited in claim 1 wherein said indicating scale is calibrated in exposure times on said meter, and means actuated consequent upon the movement of a release button of the camera shutter to operate said switching means to disconnect said light responsive means from said meter and connect said light responsive means to said electronic timing device only for the period of the shutter opening.

3. A combination as recited in claim 2, comprising a shutter member to actuate the switching means, said shutter member moving in opposite directions when the camera shutter executes a movement for opening and closing the shutter.

4. A combination as recited in claim 2 wherein said switching means is connected to a driving ring effecting the opening and closing movement of the shutter blades.